United States Patent
Stark

[11] Patent Number: 5,819,898
[45] Date of Patent: Oct. 13, 1998

[54] LOCKING ROLLER OVERRUNNING CLUTCH

[75] Inventor: Johann Stark, Biengarten, Germany

[73] Assignee: INA Walzlager Schaeffler KG, Germany

[21] Appl. No.: 812,838

[22] Filed: Mar. 6, 1997

[30] Foreign Application Priority Data

Apr. 12, 1996 [DE] Germany .......... 196 14 512.0

[51] Int. Cl.⁶ .................................................. F16D 41/067
[52] U.S. Cl. .................. 192/45; 192/113.32; 277/637; 277/650
[58] Field of Search ................ 192/45, 113.32; 188/82.84; 384/470, 477, 484; 277/637, 644, 650

[56] References Cited

U.S. PATENT DOCUMENTS

| | | | |
|---|---|---|---|
| 3,554,621 | 1/1971 | McAllister | 384/484 |
| 5,007,514 | 4/1991 | Hattori et al. | 192/45 |
| 5,156,246 | 10/1992 | Iga et al. | 192/45 |
| 5,482,150 | 1/1996 | Stark | 192/45 |

FOREIGN PATENT DOCUMENTS

| | | |
|---|---|---|
| 6941547 | 10/1969 | Germany . |
| 4015790 | 11/1990 | Germany . |
| 4210560 | 10/1993 | Germany . |

OTHER PUBLICATIONS

Patent Abstracts of Japan, Application No. 05,250,142 Mar. 28, 1995.

*Primary Examiner*—Richard M. Lorence
*Attorney, Agent, or Firm*—Bierman, Muserlian and Lucas

[57] ABSTRACT

A locking roller overrunning clutch comprising an outer bush (2) having a radial flange (10) at one front end, locking ramps (9) for locking rollers (7) being circumferentially spaced along an inner periphery of the outer bush (2), the overrunning clutch further comprising a cage (3) arranged within the outer bush (2) and having pockets (6) for lodging the locking rollers (7), the pockets (6) being defined by end rings (4) of the cage (3) and by circumferentially spaced crossbars (5) which connect the end rings (4) to each other, at least one of the end rings (4) comprising centering lugs (12) for interlocking with the locking ramps (9), characterized in that the locking ramps (9) extend in axial direction up to an open front end of the outer bush (2) situated away from the radial flange (10), and at least the end ring (4) arranged at the open front end of the outer bush (2) comprises a sealing lip (13) arranged on the end ring (4) on a peripheral surface thereof facing the outer bush (2) and seals a gap formed between the end ring (4) and the bush (2).

3 Claims, 1 Drawing Sheet

LOCKING ROLLER OVERRUNNING CLUTCH

FIELD OF THE INVENTION

A locking roller overrunning clutch comprising an outer bush having a radial flange at one front end, locking ramps for locking rollers being circumferentially spaced along an inner periphery of the outer bush, the overrunning clutch further comprising a cage arranged within the outer bush and having pockets for lodging the locking rollers, the pockets being defined by end rings of the cage and by circumferentially spaced crossbars which connect the end rings to each other, at least one of the end rings comprising centering lugs for interlocking with the locking ramps.

BACKGROUND OF THE INVENTION

A cage of this type is known, for instance, from U.S. Pat. No. 5,007,514 wherein the cage is at first filled with locking rollers and then inserted into the outer bush. At its end away from the radial flange, the outer bush comprises a circumferential groove on its inner surface into which a bead formed integrally on the outer peripheral surface of the adjacent end ring engages. This bead is snapped into the circumferential groove so that the outer bush and the cage are inseparable from each other in axial direction. A drawback of this locking roller overrunning clutch is that the gap between the outer bush and the end ring at the open end of the outer bush situated away from the radial flange is not sealed. Though the peripheral bead engaging into the circumferential groove does offer some protection against undesired leakage of lubricant and access of extraneous matter, this protection is inadequate for certain mounting locations of the locking roller overrunning clutch. A further drawback of this prior art device are the higher costs of manufacture due to the circumferential groove which has to be made in the outer bush.

OBJECTS OF THE INVENTION

It is an object of the invention to create a locking roller overrunning clutch whose outer bush is more economical to manufacture than the outer bushes of known locking roller overrunning clutches.

It is a further object of the invention to significantly reduce the danger of an undesired leakage of lubricant from the overrunning clutch and an undesired access of extraneous matter thereto.

These and other objects and advantages of the invention will become obvious from the following detailed description.

SUMMARY OF THE INVENTION

The locking roller overrunning clutch of the invention comprises an outer bush (2) having a radial flange (10) at one front end, locking ramps (9) for locking rollers (7) being circumferentially spaced along an inner periphery of the outer bush (2), the overrunning clutch further comprising a cage (3) arranged within the outer bush (2) and having pockets (6) for lodging the locking rollers (7), the pockets (6) being defined by end rings (4) of the cage (3) and by circumferentially spaced crossbars (5) which connect the end rings (4) to each other, at least one of the end rings (4) comprising centering lugs (12) for interlocking with the locking ramps (9), characterized in that the locking ramps (9) extend in axial direction up to an open front end of the outer bush (2) situated away from the radial flange (10), and at least the end ring (4) arranged at the open front end of the outer bush (2) comprises a sealing lip (13) arranged on the end ring (4) on a peripheral surface thereof facing the outer bush (2) and seals a gap formed between the end ring (4) and the bush (2).

The invention achieves the above objects by the fact that the locking ramps extend in axial direction up to the open front end of the outer bush situated away from the radial flange, and at least the end ring arranged at the open front end of the outer bush comprises a sealing lip arranged on the end ring on a peripheral surface thereof facing the outer bush and seals a gap formed between the end ring and the bush. The outer bush can be made particularly advantageously by deep drawing and the circumferential groove on the open front end can be omitted. This means that the deep drawing tools can be of a simpler and therefore more economical configuration.

When the cage containing the locking rollers is inserted into the outer bush, the sealing lip bears impeccably against the inner peripheral surface of the outer bush, so that it is guaranteed that no undesired matter can pass between the cage and the outer bush to enter the region of the locking rollers and no lubricant can leak out between the cage and the outer bush.

According to a preferred embodiment of the invention, the sealing lip is interrupted in peripheral direction by the centering lugs. The centering lugs bear closely against the locking ramps so that the formation of a gap between the centering lugs and the outer bush is practically excluded. Thus, sealing by the sealing lip is only required in the regions where a gap is formed peripherally adjacent to the centering lugs. This is achieved by the fact that the sealing lip bears closely against the inner peripheral surface of the outer bush.

The sealing lip is preferably formed integrally on the cage by injection molding of a plastic material. The plastic material used for making the cage is at the same time also suitable for making the sealing lip which preferably extends only over a part of the axial dimension of the end ring because, otherwise, due to the reduced deformability of the sealing lip, the indenting force exerted by the cage on the outer bush can increase.

Under certain circumstances, however, it is advantageous to use a two-component injection molding technique, using a first plastic material for making the cage and a second plastic material for making the sealing lip. Protection against an access of impurities to the pockets and an undesired leakage of lubricant can be further increased by providing additional sealing lips along the crossbars on their outer surfaces facing the outer bush, which sealing lips seal a gap formed between the crossbars and the outer bush.

BRIEF DESCRIPTION OF THE DRAWINGS

The invention will now be described more closely with the help of an example of the embodiment represented in three figures.

DETAILED DESCRIPTION OF THE INVENTION

Figure 1:
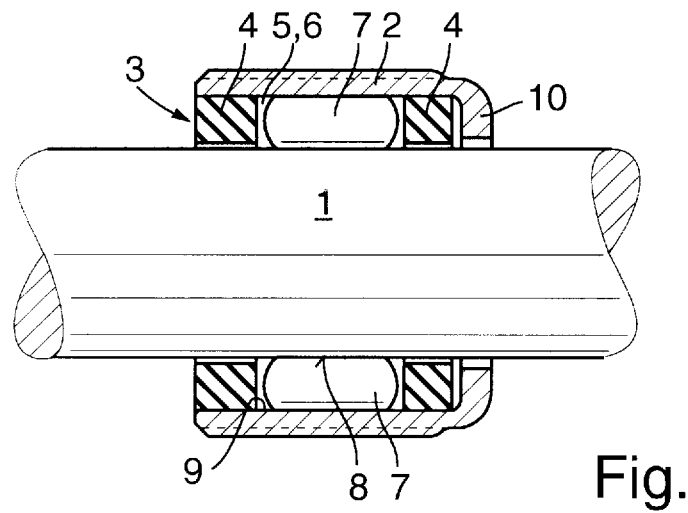
FIG. 1 shows a longitudinal cross-section of a locking roller overrunning clutch of the invention.

FIG. 1 shows a locking roller overrunning clutch of the invention in a longitudinal cross-section. A cage 3 comprising an end ring 4 at each front end and crossbars 5 connecting the end rings 4 to each other is arranged between a shaft 1 and an outer bush 2 extending coaxially thereto. Pockets 6, in each of which is arranged a locking roller 7, are defined in spaced relationship along the periphery of the cage 3 by the crossbars 5 and the end rings 4. The locking rollers 7 are in a permanent state of locking readiness to lock with a locking surface 8 constituted by the outer cylindrical surface of the shaft 1 and with locking ramps 9 formed in peripheral direction on the inner surface of the outer bush 2. At one of its front ends, the outer bush 2 comprises a radial flange 10, and the locking ramps 9 extend up to the other, open front end of the outer bush 2 situated away from the radial flange 10.

Figure 2:
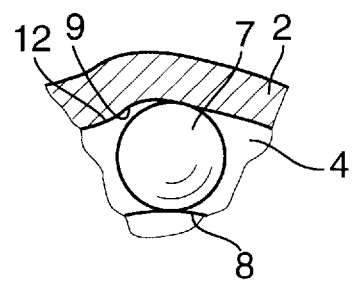
FIG. 2 is a fragmentary cross-section through the locking roller overrunning clutch of FIG. 1.

FIG. 2 is a cross-sectional view showing the configuration of the locking surface 8 and the locking ramps 9.

Figure 3:
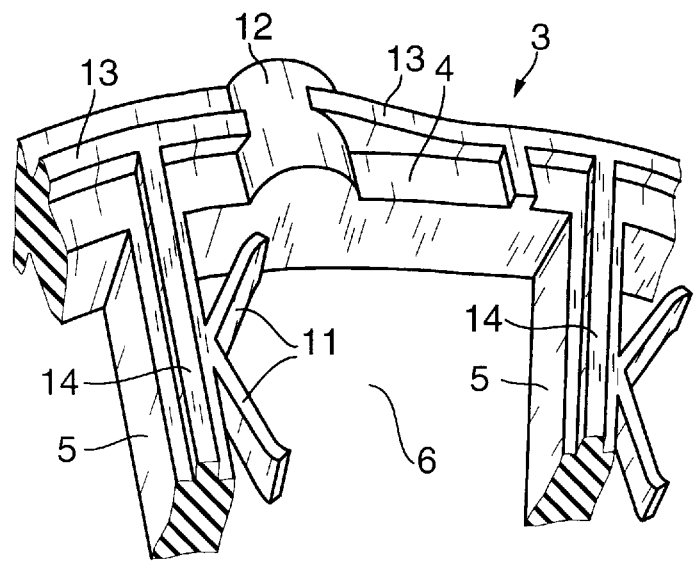
FIG. 3 is a partial perspective view of the locking roller overrunning clutch of the invention.

The perspective top view of the cage 3 in FIG. 3 shows one of the two end rings 4 with integrally formed crossbars 5. One side of each crossbar 5 defining a pocket 6 is provided with integrally formed elastic arms 11, which urge the locking roller 7, not shown in this figure, resiliently against the locking surface 8 and the locking ramps 9. A centering of the cage 3 in the outer bush 2 is obtained by providing circumferentially spaced centering lugs 12 on the outer surfaces of the two end rings 4 for positive engagement with the locking ramps 9 of the outer bush 2. A gap formed between the end ring 4 and the outer bush 2 is sealed by a sealing lip 13 formed integrally on the peripheral surface of the end ring 4 facing the outer bush 2. This sealing lip 13 is interrupted in circumferential direction only by the centering lugs 12 which bear directly against the locking ramps 9. The sealing lip 13 bears snugly against the inner contour of the outer bush 2 and thus effects an assured sealing of the gap. On their surfaces facing the outer bush 2, the crossbars 5 comprise further sealing lips 14 which likewise bear snugly against the inner contour of the outer bush 2. These sealing lips 14 enhance the quality of sealing of the individual pockets 6 of the cage 3.

Various modifications of locking roller overrunning clutch of the invention may be made without departing from the spirit or scope thereof and it is to be understood that the invention is intended to be limited only as defined in the appended claims.

What I claim is:

1. A locking roller overrunning clutch comprising an outer bush (2) having a radial flange (10) at one front end, locking ramps (9) for locking rollers (7) being circumferentially spaced along an inner periphery of the outer bush (2) , the overrunning clutch further comprising a cage (3) arranged within the outer bush (2) and having pockets (6) for lodging the locking rollers (7), the pockets (6) being defined by end rings (4) of the cage (3) and by circumferentially spaced crossbars (5) which connect the end rings (4) to each other, at least one of the end rings (4) comprising centering lugs (12) for interlocking with the locking ramps (9) , characterized in that the locking ramps (9) extend in axial direction up to an open front end of the outer bush (2) situated away from the radial flange (10), and at least the end ring (4) arranged at the open front end of the outer bush (2) comprises a sealing lip (13) arranged on the end ring (4) on a peripheral surface thereof facing the outer bush (2) and seals a gap formed between the end ring (4) and the bush (2) and the sealing lip (13) is interrupted in peripheral direction by the centering lugs (12).

2. A locking roller overrunning clutch comprising an outer bush (2) having a radial flange (10) at one front end, locking ramps (9) for locking rollers (7) being circumferentially spaced along an inner periphery of the outer bush (2), the overrunning clutch further comprising a cage (3) arranged within the outer bush (2) and having pockets (6) for lodging the locking rollers (7), the pockets (6) being defined by end rings (4) of the cage (3) and by circumferentially spaced crossbars (5) which connect the end rings (4) to each other, at least one of the end rings (4) comprising centering lugs (12) for interlocking with the locking ramps (9), characterized in that the locking ramps (9) extend in axial direction up to an open front end of the outer bush (2) situated away from the radial flange (10) , and at least the end ring (4) arranged at the open front end of the outer bush (2) comprises a sealing lip (13) arranged on the end ring (4) on a peripheral surface thereof facing the outer bush (2) and seals a gap formed between the end ring (4) and the bush (2), the sealing lip (13) is integrally formed on the cage (3) by injection molding of a plastic material and the cage (3) is made of a first plastic material and the sealing lip (13) is made of a second plastic material.

3. A locking roller overrunning clutch comprising an outer bush (2) having a radial flange (10) at one front end, locking ramps (9) for locking rollers (7) being circumferentially spaced along an inner periphery of the outer bush (2), the overrunning clutch further comprising a cage (3) arranged within the outer bush (2) and having pockets (6) for lodging the locking rollers (7), the pockets (6) being defined by end rings (4) of the cage (3) and by circumferentially spaced crossbars (5) which connect the end rings (4) to each other, at least one of the end rings (4) comprising centering lugs (12) for interlocking with the locking ramps (9), characterized in that the locking ramps (9) extend in axial direction up to an open front end of the outer bush (2) situated away from the radial flange (10), and at least the end ring (4) arranged at the open front end of the outer bush (2) comprises a sealing lip (13) arranged on the end ring (4) on a peripheral surface thereof facing the outer bush (2) and seals a gap formed between the end ring (4) and the bush (2) and additional sealing lips (14) are arranged along the crossbars (5) on the outer surface thereof facing the outer bush (2), which sealing lips (14) seal a gap formed between the crossbars (5) and the outer bush (2).

* * * * *